United States Patent
Niebuhr

(10) Patent No.: US 6,172,754 B1
(45) Date of Patent: Jan. 9, 2001

(54) MEASURING SYSTEM USING LASER TECHNIQUE FOR THREE-DIMENSIONAL OBJECTS

(75) Inventor: Erik Niebuhr, Halle (DE)

(73) Assignee: Uteda-Dr. Niebuhr GmbH, Halle (DE)

( * ) Notice: Under 35 U.S.C. 154(b), the term of this patent shall be extended for 0 days.

(21) Appl. No.: 09/381,790
(22) PCT Filed: Mar. 23, 1998
(86) PCT No.: PCT/DE98/00833
§ 371 Date: Sep. 22, 1999
§ 102(e) Date: Sep. 22, 1999
(87) PCT Pub. No.: WO98/43113
PCT Pub. Date: Oct. 1, 1998

(30) Foreign Application Priority Data

Mar. 24, 1997 (DE) .............................. 197 12 208
Mar. 21, 1998 (DE) .............................. 198 12 431

(51) Int. Cl.$^7$ .................. G01B 11/24; G01C 15/00
(52) U.S. Cl. ................. 356/376; 356/5.01; 356/380
(58) Field of Search ...................... 356/380, 376, 356/371, 3.01–5.01; 348/140

(56) References Cited

U.S. PATENT DOCUMENTS

| | | | | |
|---|---|---|---|---|
| 3,833,807 | * | 9/1974 | Takeda et al. | 250/234 |
| 5,073,819 | * | 12/1991 | Gates et al. | 358/107 |
| 5,570,186 | * | 10/1996 | Satzger et al. | 356/376 |
| 5,703,782 | * | 12/1997 | Dundorf | 364/474.24 |
| 5,886,775 | * | 3/1999 | Houser et al. | 356/4.01 |

FOREIGN PATENT DOCUMENTS

| | | | | |
|---|---|---|---|---|
| 41191180 | * | 12/1992 | (DE) | G01C/15/00 |
| 42 10 245 | | 9/1993 | (DE) . | |
| 43 40 756 | | 6/1994 | (DE) . | |
| 195 43 299 | | 5/1997 | (DE) . | |
| WO 89/10538 | * | 11/1989 | (WO) | G01C/15/00 |

* cited by examiner

Primary Examiner—Frank G. Font
Assistant Examiner—Layla Lauchman
(74) Attorney, Agent, or Firm—Collard & Roe, P.C.

(57) ABSTRACT

The invention relates to a laser-assisted measuring system for three-dimensional objects and complex surfaces. In accordance with the invention, three-dimensional objects are preferably interior areas of buildings or geological hollows with complex surfaces. The invention makes a considerable contribution to the rationalization and improvement of precision in measuring operations of this kind. In the known pulse operation time method, the distance is measured by a laser pulse from the transmitter to the measuring point and back. A measurement fan is generated on emission of laser pulses. In accordance with the invention, the measurement fan (11) must be turned 360° step by step at a constant speed, in order to cover a three-dimensional area. In a wall, up to 200,000 measuring points can be obtained. An appropriate evaluation of the measurement data takes place so that a 3D wire model can be constructed.

6 Claims, 3 Drawing Sheets

MEASURING SYSTEM USING LASER TECHNIQUE FOR THREE-DIMENSIONAL OBJECTS

BACKGROUND OF THE INVENTION

1. Field of the Invention

The present invention relates to a measuring system using laser technique for three-dimensional objects and complex surfaces. According to the invention, three-dimensional objects are preferably interior rooms in buildings with central stairwells and corridors, i.e. all interior rooms from basements to attics. Geological hollows with complex surfaces shall be cited as further examples whose surveying is possible with the novel measuring system using laser technique.

2. The Prior Art

For the professional groups architecture, building trade, expert consultants and restorers but also surveying firms, geologists and archaeologists the manual measuring out of existing interior spaces (the so-called "measuring up") or natural hollows is a frequently occurring and often rather complicated working process which entails considerable time and personnel efforts. In addition the "human" factor brings about errors and measuring inaccuracies that can only be corrected by repeated measuring. It can be stated in this context that the commonly used procedure, in which only an insufficient number of measuring points are determined manually, makes further inaccuracies in the sense of a true representation of deformation unavoidable.

It is a known fact that surveying of buildings has been conducted by means of photogrammetry for years. The following facts shall be stated regarding the above method:

The evaluation of the measurements which are available as digitised photos has only been partially automated to date, while essentially the recognition and determination of the object boundaries (i.e. visible edges and valleys) is done manually.

It is due to the limited aperture angle and/or the strong boundary distortions in case of large aperture angles ("fisheye") that nearly exclusively facades or architectural details are measured.

The high manual efforts and the pertaining costs are very high. In addition, the currently available measuring methods only allow for the determination of max. 3,000 measuring points per working day.

One measuring method in which laser technique is adopted is the pulse operation time method in which an extremely short light-induced pulse is emitted from a laser source and deflected via a mirror which rotates at a high angular speed. Said light-induced pulses are reflected by an object to be measured that is located at a max. distance of 50 m and recorded by an existing receiver in a laser scanner. The period of time between the emitting and receiving is measured and thus the distance to the scanned measuring object is determined for each ray and for each point on the scanned surface. This measuring method by means of a singular light-induced pulse from a transmitter to a measuring point and back to a receiver is called "pulse operation time method".

In this connection it is referred to DE 43 40 756 A 1, titled "Distance measurement using lasers". A laser radar is equipped with a pulsed laser, that emits controlled light-induced pulses into a measuring range, a photo receiver arrangement, which receives the light-induced pulses that are reflected by an object located in the measuring range, and an evaluation circuit which, under consideration of the velocity of light, uses the time period between the emission and reception of a light-induced pulse to determine a distance signal which is characteristic for the distance of the object. A light deflecting arrangement is positioned between the measuring range and the pulsed laser, said arrangement guides the light-induced pulses into the measuring range under increasingly modifying angles and simultaneously emits an angle position signal to the evaluation circuit that is representative for the instantaneous angle position. The evaluation circuit uses the distance signal and the angle position signal to determine the location of the object within the measuring range.

The quantity of the distance values obtained in a plane over a semicircle is hereunder referred to as "measurement fan".

The examples cited show that it is not possible to measure three-dimensional spaces rationally and with sufficient accuracy, as for instance required for measuring up operations, and true to deformation by applying sophisticated equipment and techniques, such as digital cameras or laser technique. In case of larger three-dimensional objects it is not possible to edit exact measurement values in the office in the sense of an integrated data system in such a way that thus all dimensions of a three-dimensional object are available for further processing. As explained earlier, also the evaluation of digitised photos (which can only be partially automated) is not a fundamental simplification of the measurement of such objects.

In accordance with DE 42 10 245 C2 a topographic recording system for an aerodynamic vehicle in order to scan the terrain is described. This is a topographic measurement method that requires the absolute coordinates to evaluate the measured data. The former are made available by GPS systems and INS (inertial navigation system) with which aircraft are equipped. As the prior state of the art, the above-mentioned DE 42 10 245 C2 states that by seeking homologous picture elements in a downstream signal preparation stage it is thus possible to use the picture signals to calculate the flight orientation data required for the evaluation in all six degrees of freedom and to create either stereoscopic image strips or a three-dimensional model of the overflown terrain in a digitised format. The further development of the prior state of the art by the invention in accordance with DE 42 10 245 C2 the absolute coordinates are still necessary. The seeking of homologous picture elements for the calculation of stereoscopic image strips is carried out with a linear-array camera and a distance sensor with a downstream signal processing stage. The correlation of homologous picture elements, however, requires very extensive calculation efforts and proposals are put forward as to how to remedy this situation. The topographic recording system takes measurements in parallel strips in this method, which in no case it suited for 3 D interior space visualisation and surveying.

SUMMARY OF THE INVENTION

The present invention is based on the task of proposing a measuring system preferably for interior spaces with which a single, automated optical measurement and computer-assisted evaluation are made and thus all measuring data—also of complex objects—are available. In this context, the present invention is also based on the task of facilitating a complete visualisation of a 3 D space from the digital measurement data.

In addition to the above the following is explained regarding the system according to the invention: The measurement fan is located vertically and moved horizontally. This mode of action yields a large amount of points located in a laffice-like structure on the limiting surfaces of a spherical environment, including their distances to the measuring point.

The measurement fan must be turned 360° in order to cover a three-dimensional space. In order to obtain a number of measured points which are necessary for the accuracy required in practical applications measuring distances of 0.25° are to be used while turning the measurement fan.

The measured data of the individual measurement fans are transmitted to a control computer in real time. The large number of measurement data obtained and by means of statistical equalisations made by the evaluation software make sure that an appropriate accuracy is achieved as is an acceptable time for an all-round measurement. The total surveying time for a complete interior space is approx. 4 minutes, with the system providing a variable speed of the turning device. The latter makes it possible to adapt the measuring process to local requirements. According to the process described each measured value can be digitised and is in a mathematical correlation to its adjacent point. The evaluation of the existing cloud of points created by the surface of the interior space shell is made by allocating the points to clusters. Said correlations are mathematically recorded in a surface structure via two-dimensional regression. Thus, the analytical expression of a plane in the space is formed. According to the position and the enhancement different types of planes can be defined. All planes are combined, their planes of section provide straight lines for the construction of a 3 D wire model with dimensions as a CAD drawing true to deformation.

Moreover, in parallel to an around survey with a laser scanner the space to be measured can also be additionally covered with a digital camera. The digital images can supply additional information in the working step "evaluation of the measurement data" and during any possible re-processing of the object data. In addition, photo-realistic representations of the measured objects can be supplementary created during presentations of the object data.

In the following a practical example is described to explain the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawing, wherein similar reference characters denote similar elements throughout the views.

DETAILED DESCRIPTION OF THE PREFERRED EMBODIMENT

Figure 2:
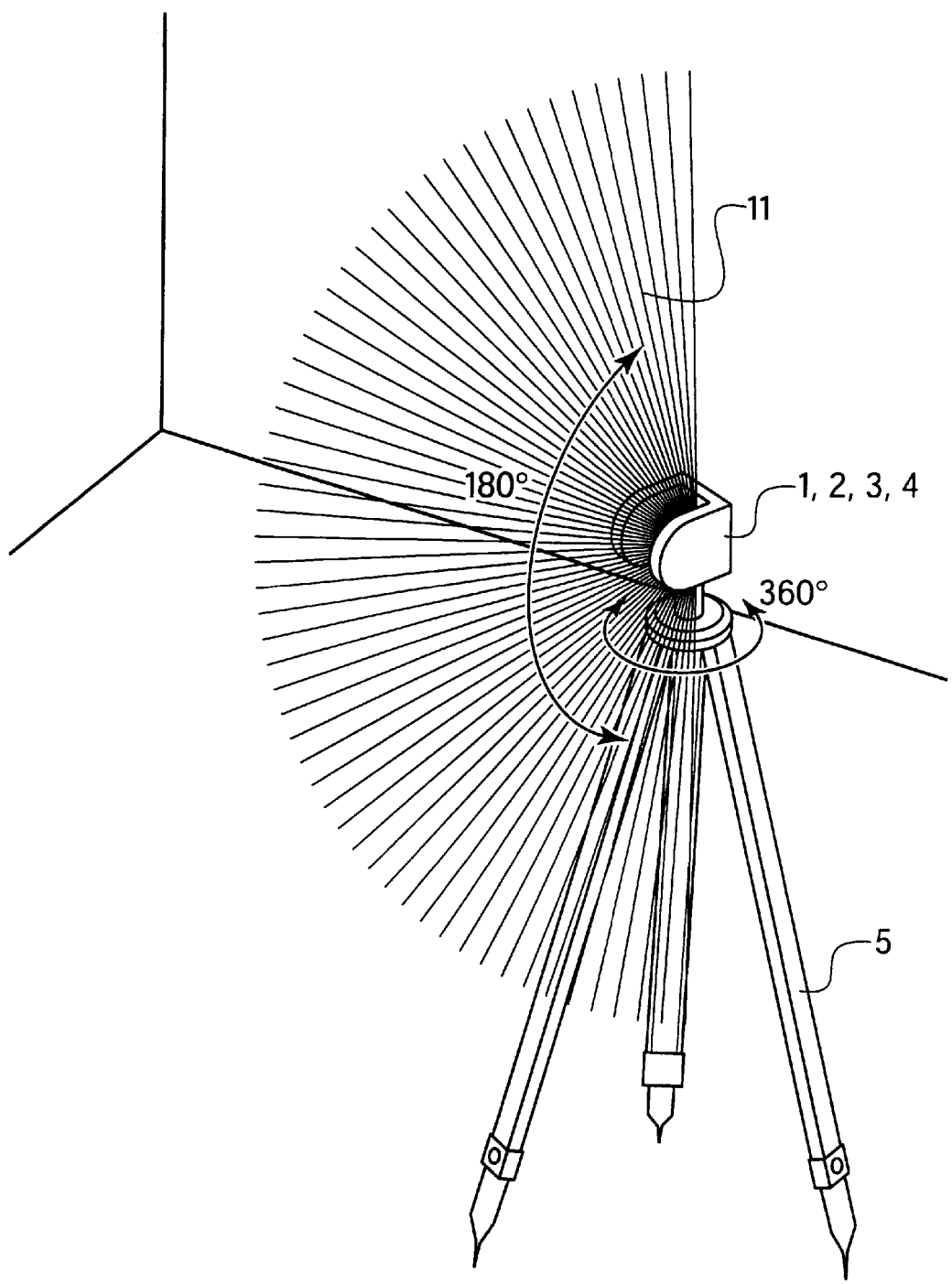
FIG. 2 shows a perspective view of a Levelling device with representation of the measurement fan movement

The laser scanner 1 which operates with the pulse operation time method is capable of measuring the distance of a given object with an accuracy of±1 mm in the range of a 200 m diameter. Appropriate control of the laser scanner 1 during the measuring process ensures that all surfaces of a space are measured individually. In FIG. 2 it can be seen which light-induced pulses are required for a fan-like presentation (measurement fan 11) and how the measurement fan 11 is turned 360°.

Figure 1:
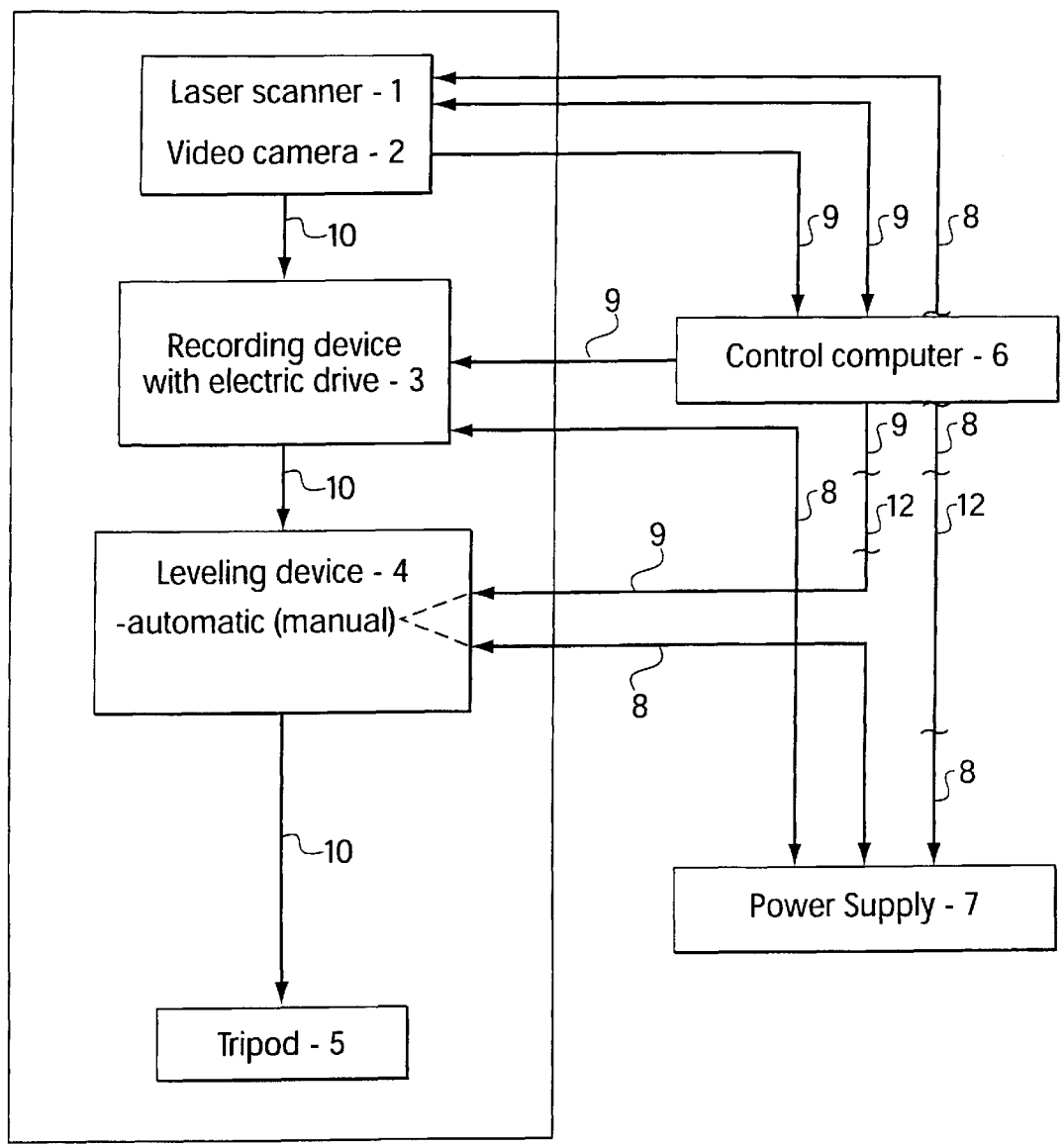
FIG. 1 shows a Block diagram according to the measuring system

The tripod 5 holds the levelling device 4, the recording device 3 for the laser scanner 1 and the video camera (digital camera). The connection of substances 10 between said components is made by mechanical connections. According to FIG. 1 the flow of energy 8 can be seen starting from the power supply 7. The flow of information 9 runs between the control computer 6 and the automatic levelling device 4, between the control computer 6 and the recording device 3 (with electric drive) as well as between the control computer and the laser scanner 1 and further the video camera. Position sign 12 denotes an automatic interruption and resetting to "0"=start in case of inaccuracies.

Figure 3:
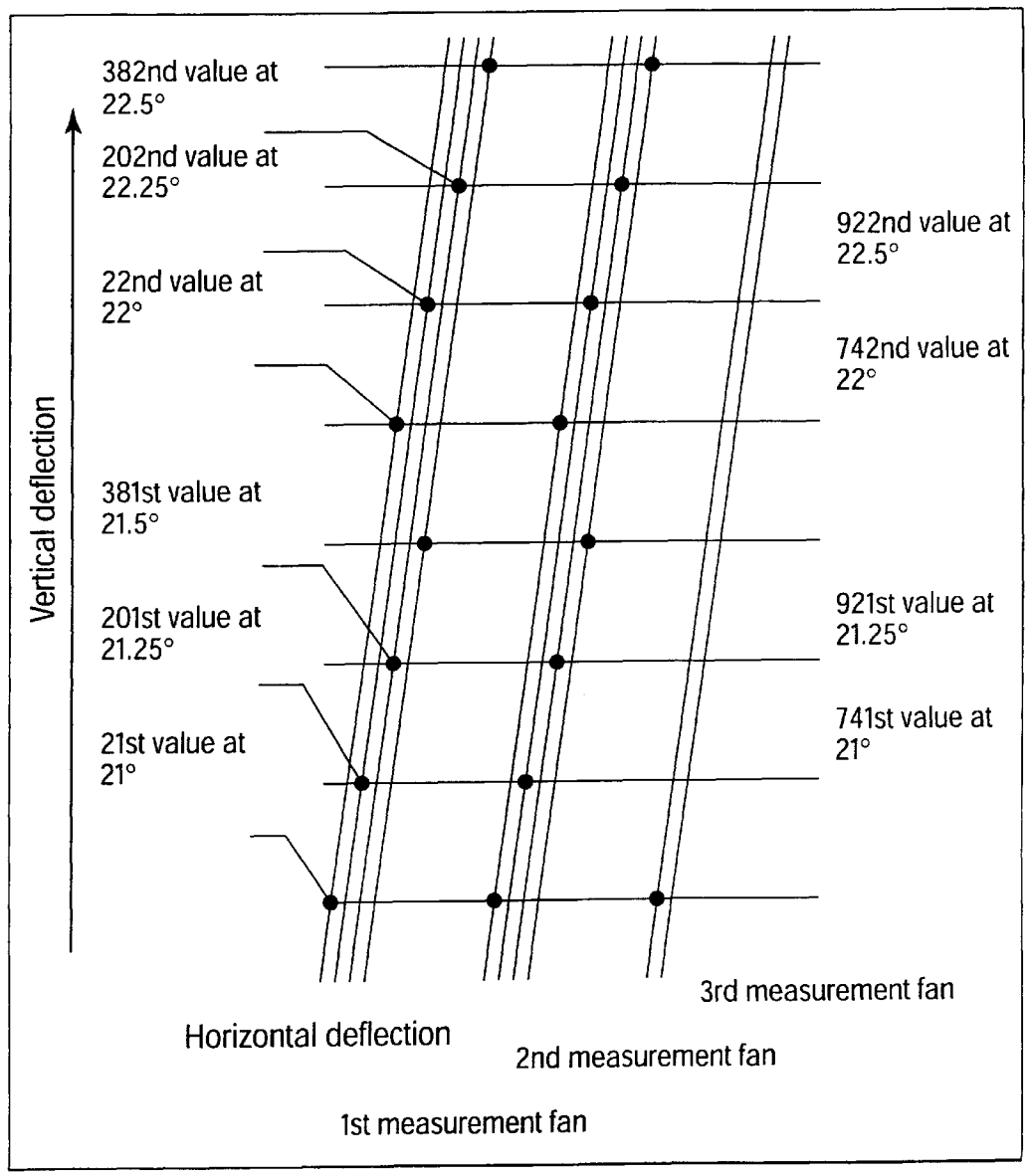
FIG. 3 shows s chart of the Arrangement of the measuring points The reference signs used have the following meanings:
1 Laserscanner
2 Video camera
3 Recording device
4 Levelling device
5 Tripod
6 Control computer
7 Power supply
8 Flow of energy
9 Flow of information
10 Connection of substances (mechanical connection)
11 Measurement fan
12 Automatic interruption

It is emphasised that the recording device continually turns 360° in 0.25° steps. During said turning the direction of the measurement fan is no longer orthogonally to the horizontal direction of rotation but as sketched in FIG. 3. Due to the fact that a number of subsequently made measurements fail to reach the same points the equalisation of measurement data that is made internally in the laser scanner cannot be used. However, the large number of measurement data obtained a statistical equalisation can be made by the evaluation software. Thus an appropriate accuracy of the results is achieved after their evaluation.

The evaluation of the measurement data is made in the evaluation computer completely independent of the time of their acquisition. The evaluation program carries out—if required in a dialog with the editor—the recognition of the individual elements of the object. In doing so, the measuring points are allocated to the limiting surfaces of a space. In the process the dispersion of the measurement data is also taken into consideration and the accuracy is improved by mean value generation of the extensive numerical material (approx. 100,000 to 200,000 values per wall).

In case of complex structures and critical measuring points, such as the starting points of the adjacent measurements, the editor can monitor and, if need be, correct the interpretation by making comparisons with the shots made with the digital camera which are displayed on the screen synchronously with the measured values and the elements that are already recognised.

The data of the individual spaces are combined with each other and assembled into a model of the entire object (thus, for instance the limiting surfaces of adjacent spaces are made into walls between said spaces). In case of several starting points within one space the same procedure is adopted. All walls are resolved into individual segments which are made up of basic geometric shapes. While doing so, matching elements are recognised. In addition, the editor has the opportunity to manipulate this process via the dialog function. The result of this working step is a Me in "DXF" format which represents the measured object as a 3 D drawing and can be directly used, e.g., with the AutoCad program.

Accordingly, while only one embodiment of the present invention has been shown and described, it is obvious that many changes and modifications may be made thereunto without departing from the spirit and scope of the invention.

What is claimed is:

1. A measuring system using laser technique for obtaining measurement data of three-dimensional objects in an interior space, comprising:
   a laser scanner for emitting and receiving laser induced pulses containing the measurement data, wherein said laser scanner creates a semicircular fan of measuring rays;
   a levelling device connected to said laser scanner for rotating said laser scanner 360 degrees;
   a recording device for receiving said measurement data; and
   a measurement data evaluator for digitizing and placing said measurement data in a mathematical correlation to its adjacent point, evaluating an existing cloud of points created by the object in the interior space by allocating points to clusters, mathematically recording said correlations in a surface structure by two-dimensional regression, defining types of planes by analytical expressions of a plane in space according to position and enhancement, wherein said planes are combined in such a way to provide straight lines for constructing a 3D model.

2. The measuring system of claim 1, wherein said measurement data evaluator is a computer.

3. The measuring system of claim 1 further comprising a video camera for surveying the object in parallel with said laser scanner.

4. The measuring system of claim 1, wherein said semicircular fan of measuring rays is turned 360 degrees step by step at a constant speed.

5. The measuring system of claim 1, wherein said semicircular fan of measuring rays is turned 360 degrees step by step at measuring intervals of $\leq 0.25$ degrees.

6. The measuring system of claim 1 further comprising a tripod for supporting said measuring system.

* * * * *